US009765449B2

(12) United States Patent
Ise et al.

(10) Patent No.: US 9,765,449 B2
(45) Date of Patent: Sep. 19, 2017

(54) POLYAMIDE FIBER AND AIRBAG FABRIC

(75) Inventors: Fumiaki Ise, Tokyo (JP); Shingo Mizuno, Tokyo (JP)

(73) Assignee: ASAHI KASEI FIBERS CORPORATION, Osaka (JP)

( * ) Notice: Subject to any disclaimer, the term of this patent is extended or adjusted under 35 U.S.C. 154(b) by 469 days.

(21) Appl. No.: 14/354,294

(22) PCT Filed: Dec. 7, 2011

(86) PCT No.: PCT/JP2011/078348
§ 371 (c)(1),
(2), (4) Date: Apr. 25, 2014

(87) PCT Pub. No.: WO2013/084326
PCT Pub. Date: Jun. 13, 2013

(65) Prior Publication Data
US 2014/0302263 A1 Oct. 9, 2014

(51) Int. Cl.
*D01F 6/60* (2006.01)
*D03D 1/02* (2006.01)
(Continued)

(52) U.S. Cl.
CPC .............. *D01F 6/60* (2013.01); *B60R 21/235* (2013.01); *D01D 5/16* (2013.01); *D03D 1/02* (2013.01);
(Continued)

(58) Field of Classification Search
CPC .. D01F 6/60; Y10T 428/1345; Y10T 428/298; Y10T 442/3065; D03D 1/02;
(Continued)

(56) References Cited

U.S. PATENT DOCUMENTS

2003/0042652 A1 3/2003 Meister et al.
2004/0012115 A1 1/2004 Minagawa et al.
(Continued)

FOREIGN PATENT DOCUMENTS

EP 1 553 217 A1 7/2005
EP 2 256 237 A1 12/2010
(Continued)

OTHER PUBLICATIONS

Office Action for Application No. 11 877 061.9-1303 dated May 8, 2015.
(Continued)

*Primary Examiner* — Michael C Miggins
(74) *Attorney, Agent, or Firm* — Finnegan, Henderson, Farabow, Garrett & Dunner LLP

(57) ABSTRACT

The purpose of the present invention is to provide a polyamide fiber from which a fabric appropriate for use in airbags is obtainable, and which exhibits weave-loosening prevention properties after weaving thereof, and excellent mechanical properties. This polyamide fiber is characterized by having; a total fiber density of 100-700 dtex; a tensile strength of 8.0-11.5 cN/dtex; a boiling-water shrinkage of 4.0-11.0%; a slack recovery rate (A) represented by formula (1) after a fixed-length heat treatment of 0-4.0%; and a tightening index (F) represented by formula (2) of 3.8 or higher. $A=[(T_a-T_b)/T_a]\times 100$ (1) (In formula (1), $T_a$ represents the amount of slack immediately after heat treatment, and $T_b$ represents the amount of slack at the time of stabilization after heat treatment.) $F=A+0.35\times B$ (2) (In formula (2), A represents the slack recovery rate after the fixed-length heat treatment, and B represents the boiling-water shrinkage rate.)

6 Claims, 3 Drawing Sheets

(51) Int. Cl.
*D01D 5/16* (2006.01)
*B60R 21/235* (2006.01)
(52) U.S. Cl.
CPC ............... *B60R 2021/23509* (2013.01); *B60R 2021/23519* (2013.01); *D10B 2331/02* (2013.01); *Y10T 428/1345* (2015.01); *Y10T 428/298* (2015.01); *Y10T 442/3065* (2015.04)
(58) Field of Classification Search
CPC ........ B60R 2021/23509; B60R 21/235; B60R 2021/23519; D01D 5/16; D10B 2331/02
See application file for complete search history.

(56) References Cited

U.S. PATENT DOCUMENTS

| | | | |
|---|---|---|---|
| 2011/0020628 A1 | 1/2011 | Fukudome et al. | |
| 2011/0036447 A1 | 2/2011 | Horiguchi et al. | |

FOREIGN PATENT DOCUMENTS

| | | |
|---|---|---|
| JP | 06-176963 | 7/1996 |
| JP | 11-172523 A | 6/1999 |
| JP | 2003-518562 A | 6/2003 |
| JP | 2006-183205 | 7/2006 |
| JP | 2006-183205 A | 7/2006 |
| JP | 2007-039871 A | 2/2007 |
| JP | 2008-208481 A | 9/2008 |
| JP | 2010-242268 A | 10/2010 |
| JP | 2011-168919 | 9/2011 |
| JP | 2011-168919 A | 9/2011 |
| JP | 2011-168938 | 9/2011 |
| WO | WO 01/48279 A2 | 7/2001 |
| WO | WO 2009/113325 A1 | 9/2009 |
| WO | WO 2009/119302 A1 | 10/2009 |

OTHER PUBLICATIONS

Supplementary European Search Report for Application No. EP 11 87 7061 dated Apr. 10, 2015.
Information Offer in JP Application No. 2013-548012 dated May 13, 2015.
International Search Report from the Japanese Patent Office for International Application No. PCT/JP2011/078348, dated Feb. 14, 2012.
Office Action for JP Application No. 2013-548012 dated Mar. 31, 2015.

(a)

(b)

(a)

(b)

(c)

(d)

POLYAMIDE FIBER AND AIRBAG FABRIC

TECHNICAL FIELD

The present invention relates to a polyamide fiber suitable for an airbag fabric. More specifically, the present invention relates to a polyamide fiber suitable for an airbag fabric capable of performing high-speed deployment and excellent in burst resistance.

BACKGROUND ART

A polyamide fiber is excellent in toughness, adhesiveness, fatigue resistance and the like, and therefore is being widely used, for example, in a tire cord, a rubber-reinforcing cord for conveyer belt, power transmission belt, rubber hose and the like, a safety belt, a tent, a braid, a sewing thread and an airbag. Reducing the amount of a material such as fiber without impairing the function is required of these industrial materials and products.

Among others, a light-weight airbag mounted in a vehicle is necessary from the standpoint of improving fuel efficiency of a vehicle or compact cabin space. On the other hand, burst resistance sufficient to cause no rupture during high-speed and high-pressure deployment is also demanded to ensure safety in a car accident.

In recent years, a curtain airbag, side airbag, knee airbag, rear airbag and the like are being put into practice, in addition to a driver's seat airbag and a passenger seat airbag, and the required properties vary according to the storage portion or capacity. For example, in the case of a driver's seat airbag, an airbag fabric foldable into a compact configuration is demanded so as to ensure visibility in front of the vehicle or facilitate viewing of gauges. The curtain airbag needs to cover the entire side surface of a vehicle, and therefore has a large feature or a complicated shape and in addition, considering the sideway rolling of the vehicle after a side collision, the deployed bag is required to maintain an inflated state for a certain amount of time. Also, in the case of a side airbag, a knee airbag and the like, since the storage site and the passenger are close to each other and the bag actuation distance is restricted, the airbag must be deployed in a shorter time. Accordingly, it is more strongly demanded to enable high-speed deployment and enhance/maintaining burst resistance while realizing weight reduction and compactness.

Patent Documents 1 and 2 disclose a technique for obtaining a polyhexamethylene adipamide fiber having certain fiber structure properties, where at least 95 mol % is composed of a hexamethylene adipamide unit and the sulfuric acid relative viscosity is 3.0 or more. This fiber has a strength of 11.0 g/d or more, an elongation of 16% or more and a shrinkage in boiling water of 4% or less and is a so-called high-strength nylon 66 fiber, and such a nylon 66 fiber may be excellent in the mechanical properties but still has a problem with the yield in the weaving process or with the burst resistance in use as an airbag.

Patent Document 3 discloses a technique for obtaining a side airbag fabric having excellent performance in terms of storability, low impact and high-speed deployment. However, the fiber used in this technique has absolutely low fineness and, despite excellent performance in terms of storability, low impact and high-speed deployment, the mechanical strength is lacking. In addition, because of a polyester, the heat capacity is small as compared to a polyamide, causing a problem in airbag deployment where a deployment gas reaches a high temperature.

PRIOR ART

Patent Document

Patent Document 1: Japanese Unexamined Patent Publication No. 6-248508
Patent Document 2: Japanese Unexamined Patent Publication No. 6-299411
Patent Document 3: Japanese Unexamined Patent Publication No. 8-011660

SUMMARY OF THE INVENTION

Problems to be Solved by the Invention

An object of the present invention is to provide a polyamide fiber for obtaining a fabric excellent in the mechanical properties and loosening resistance after weaving, and an airbag fabricated using a fabric composed of the fiber, which is compact, excellent in storability and loosening resistance, deployable at a high speed and excellently resistant to bursting.

Means to Solve the Problems

As a result of intensive studies to attain the above-described object, the present inventors have found that the thermal behavior of weaving yarn in the heat treatment when weaving an airbag fabric is related to the loosening resistance. The present invention has been accomplished based on this finding. That is, the present invention provides the following aspects.

(1) A polyamide fiber, wherein the total fineness is from 100 to 700 dtex, the tensile strength is from 8.0 to 11.5 cN/dtex, the shrinkage in boiling water is from 4.0 to 11.0%, the slack recovery rate A after fixed-length dry heat treatment represented by the following formula (1) is from 0 to 4.0%, and the tightening factor F represented by the following formula (2) is 3.8 or more:

$$A=[(Ta-Tb)/Ta]\times 100 \quad \text{formula (1)}$$

(wherein Ta is the amount of slack immediately after heat treatment, and Tb is the amount of slack when stabilized after heat treatment);

$$F=A+0.35\times B \quad \text{formula (2)}$$

(wherein A is the slack recovery rate after fixed-length dry heat treatment, and B is the shrinkage in boiling water).

(2) The polyamide fiber according to (1) above, wherein the physical property retention percentage of tensile strength and tensile elongation at break after a heat resistance test at 110° C. for 3,000 hours is 80% or more.

(3) The polyamide fiber according to (2) above, wherein the physical property retention percentage of tensile strength and tensile elongation at break after a heat resistance test at 110° C. for 3,000 hours is 90% or more.

(4) An airbag fabric comprising the polyamide fiber according to any one of (1) to (3) above.

(5) An airbag comprising the airbag fabric according to (4) above.

(6) A method for producing a polyamide fiber, wherein when a filament yarn spun from a spinneret is subjected to a multistage stretching treatment consisting of a cold stretching stage and a hot stretching stage and then taken up, stretching for 25 to 60% of the total draw ratio is performed in the cold stretching stage at less than 150° C. and the remaining stretching is performed in the hot stretching stage at 150° C. or more.

(7) The method for producing a polyamide fiber according to (6) above, wherein after the multistage stretching treatment, a stepwise relaxation treatment involving a stepwise drop of temperature between 250° C. and 50° C. is applied in two or more stages and the yarn is then taken up.

(8) The method for producing a polyamide fiber according to (6) or (7) above, wherein the surface of the initial roll in the hot stretching stage is a satin finish surface having a roughness Ra of 2 μm or more.

Effects of the Invention

The polyamide fiber of the present invention shows an appropriate thermal behavior in a heat treatment step after weaving, and therefore is excellent in loosening resistance. Also, the polyamide fiber of the present invention can provide a fabric for an airbag that is deployable at a high speed, excellently resistant to bursting, compact, and excellent in storability.

MODE FOR CARRYING OUT THE INVENTION

Figure 1:
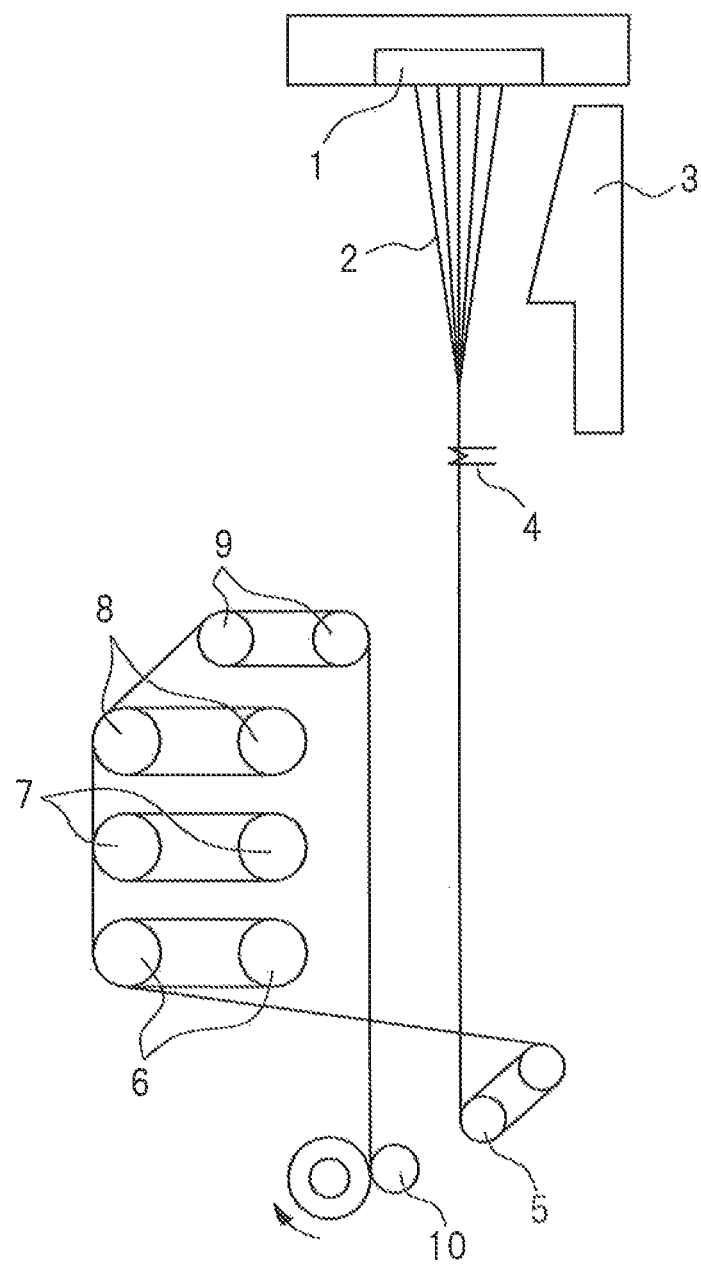
FIG. 1 is a view illustrating one example of the equipment for producing the polyamide fiber of the present invention.

The polymer constituting the polyamide fiber of the present invention includes polyamide 6, polyamide 6•6, polyamide 11, polyamide 12, polyamide 6•10, polyamide 6•12, polyamide 4•6, a copolymer thereof, and a polymer composed of a mixture thereof. Among these, polyamide 6•6 is preferred, and the polyamide 6•6 fiber is mainly composed of a polyhexamethylene adipamide fiber. The polyhexamethylene adipamide fiber indicates a polyamide fiber consisting of 100% of hexamethylenediamine and adipic acid and having a melting point of 250° C. or more, but in the polyamide 6•6 fiber for use in the present invention, polyamide 6, polyamide 6•I, polyamide 6•10, polyamide 6•T or the like may be copolymerized or blended with polyhexamethylene adipamide as long as the melting point is kept from becoming less than 250° C. Incidentally, such a fiber may contain various additives usually used for improving the productivity or characteristics in the production step or processing step of the original yarn. For example, a thermal stabilizer, an antioxidant, a light stabilizer, a lubricating agent, an antistatic agent, a plasticizer, a thickener, a pigment and a flame retardant may be incorporated.

The total fineness of the polyamide fiber of the present invention is preferably from 100 to 700 dtex, more preferably from 150 to 600 dtex, still more preferably from 200 to 470 dtex, yet still more preferably from 210 to 360 dtex. As the total fineness is 100 dtex or more and is larger, the mechanical strength is more satisfactory, and as the total fineness is 700 dtex or less and is smaller, the storability is more excellent.

The single yarn fineness is preferably from 1 to 7 dtex, more preferably from 1.5 to 6.0 dtex, still more preferably from 2.5 to 5.7 dtex, yet still more preferably from 3.3 to 4.9 dtex. With a single yarn fineness of 1 dtex or more, the yarn hardly suffers from the problem in productivity and can have suitable weavability. As the single yarn fineness is 7 dtex or less and is smaller, the fabric obtained is softer and can be folded into a more compact configuration, leading to enhanced storability, and the flatness of the fabric is improved to ensure an airbag advantageous for high-speed deployment. Even under high differential pressure as when deploying an airbag, low air permeability is readily obtained.

The tensile strength is preferably from 8.0 to 11.5 cN/dtex, more preferably from 8.5 to 11.5 cN/dtex, still more preferably from 9.5 to 11.5 cN/dtex, yet still more preferably from 9.8 to 11.5 cN/dtex. When the strength is 8.0 cN/dtex or more, the intended mechanical properties of the present invention are obtained and the fiber is sufficient as a fiber for industrial materials, whereas when the strength is 11.5 cN/dtex or less, the fiber quality is excellent and, for example, the occurrence frequency of broken filaments in yarn is low, as a result, reduction in the spinning yield does not occur or a weaving trouble in the post-processing is not caused.

The intermediate elongation in the tensile test is preferably less than 12.5%, more preferably 12.0% or less, and most preferably 11.5% or less. A smaller intermediate elongation of less than 12.5% contributes to increasing the later-described slack recovery rate after fixed-length dry heat treatment. On the other hand, the intermediate elongation is preferably 8.0% or more so as to facilitate retaining the mechanical properties after a heat resistance test.

The polyamide fiber of the present invention is woven and used preferably for application as an industrial material, in particular, an airbag fabric. As the airbag fabric, in view of mechanical properties and low air permeability, a high-density fabric increased in the weave density is often used. The high-density fabric as used herein indicates a fabric having a cover factor of 1,500 or more. The cover factor of the airbag fabric of the present invention is, in view of low air permeability, preferably from 1,500 to 2,500, more preferably from 1,550 to 2,225, still more preferably from 1,600 to 2,180, yet still more preferably from 1,700 to 2,100. When the cover factor is 1,500 or more, the tensile strength or tear strength of the fabric are satisfactory, and a fabric resistant to loosening is obtained. Also, when the cover factor is 2,500 or less, the fabric is kept from excessively increasing in the rigidity or allowing for deterioration of the foldability or storability. The cover factor is represented by $[\sqrt{(D1)} \times (N1) + \sqrt{(D2)} \times (N2)]$, wherein D1 is the warp total fineness (dtex), N1 is the warp density (ends/2.54 cm), D2 is the weft total fineness (dtex), and N2 is the weft density (ends/2.54 cm).

Also, in order to exhibit sufficient resistance to loosening during deployment of an airbag obtained from the airbag fabric, the weaving yarn must have a property of exhibiting an appropriate thermal behavior, because the behavior of weaving yarn during heat treatment after weaving affects the air permeability or loosening of the airbag. In the fabric, slack is produced along with cooling after the heat treatment. Thereafter, a behavior of partially recovering the slack is observed. This reflects the behavior of the weaving yarn. However, the weaving yarn state of the fabric resulting from the heat treatment after weaving cannot be expressed only by the shrinkage in boiling water, which is a representative value of the heat shrinkage of fiber, and the slack recovery rate after fixed-length dry heat treatment must be taken into account. The slack recovery rate (A) after fixed-length dry heat treatment indicates the percentage change in which the fiber shrinks to recover the slack from the slacked state after fixed-length dry heat treatment in a state of being wound around a frame, that is, is represented by the following formula (1):

$$A(\%)=[(Ta-Tb)/Ta]\times 100 \quad (1)$$

In formula (1), Ta is the amount of slack immediately after heat treatment, and Tb is the amount of slack when stabilized after heat treatment.

The slack recovery rate after fixed-length dry heat treatment is preferably from 0.1 to 4.0%, more preferably from 0.3 to 3.5%. When the slack recovery rate is 4.0% or less, the percentage dimensional change after dry heat treatment of the fabric is small. Also, the fiber molecular structure after hot aging is stable, and the strength and elongation properties are less changed. When the slack recovery rate is 0.1% or more, the weaving yarn after the heat treatment is tightened, so that the weave loosening can be suppressed. A slack recovery rate of 0% means the state where the slack is not recovered and the slacked state remains as it is. The slack recovery rate can be controlled by the ratio between cold stretching and hot stretching in the stretching conditions. By keeping the stretching in the cold stretching stage to 55% or less, the molecular structure can be sufficiently developed in the hot stretching stage and in turn, the slack recovery rate can be increased. The proportion in the cold stretching stage is the cold draw ratio based on the total draw ratio. Furthermore, when the heat setting temperature is set to multiple stages from high temperature to low temperature, this greatly contributes to enlarging the slack recovery rate.

In addition, it has been found that the tightening factor (F) represented by the following formula (2) participates in the configuration stability of weave pattern:

$$F=A+0.35\times B \quad (2)$$

In formula (2), A is the slack recovery rate after fixed-length dry heat treatment, and B is the shrinkage in boiling water.

In the present invention, the tightening factor F is preferably 3.8 or more, more preferably from 3.8 to 8.0, still more preferably from 3.8 to 5.5, yet still more preferably from 3.8 to 4.5. When F is 3.8 or more, the fiber recovers from the slacked state produced after post-weaving heat treatment, as a result, the weave loosening is suppressed, and air permeability through a loosening of the fabric is reduced. Also, loosening under stress during airbag deployment is suppressed, and the airbag deployment speed rises. On the other hand, when the tightening factor F is 8.0 or less, the dimensional change produced during processing after weaving is relatively stable, and a wrinkle or the like is less likely to occur. The tightening factor F is restricted also by the slack recovery rate A after fixed-length dry heat treatment and the upper limit of the shrinkage B in boiling water.

The shrinkage in boiling water is preferably from 4.0 to 11.0%, more preferably from 5.0 to 10.5%, still more preferably from 6.0 to 10.5%. The shrinkage in boiling water, where a weaving yarn having a stable performance such as quality in terms of broken filaments in yarn is obtained as a high-strength fiber, is substantially 11.0% or less. When the shrinkage in boiling water is 4.0% or more, a high-density fabric is easily obtained. The shrinkage in boiling water can be controlled by the heat setting temperature, the roll contact or residence time, and the amount of relaxation by a relax roll. In these relaxation treatments, not only a strain produced by hot stretching can be removed but also by adjusting the heat setting temperature or the roll contact or residence time, the structure achieved by stretching can be fixed or the orientation in the amorphous region can be relaxed to establish a proper relationship between the shrinkage in boiling water and the shrinkage after heat treatment. When the heat setting temperature is set low, the shrinkage in boiling water becomes large; when the roll contact or residence time is set short, the shrinkage in boiling water becomes large; and when the percentage of relaxation treatment is set small, the shrinkage in boiling water becomes large.

Also, it is important to withstand the environmental load lasting for a long time after the storage of airbag and maintain a sufficient performance during deployment. In the polyamide fiber of the present invention, the physical property retention percentage of tensile strength and tensile elongation at break after a heat resistance test at 110° C. for 3,000 hours is preferably 80% or more, more preferably 90% or more.

Therefore, the polyamide fiber preferably contains a heat stabilizer. For example, the polyamide fiber preferably contains a copper element in an amount of 20 to 100 ppm and contains iodine or bromine in an amount of 500 to 3,500 ppm in terms of element. The copper element may be added in the form of a compound such as copper iodide, copper bromide and copper acetate. Also, the iodine and bromine can be added in the form of a compound such as potassium iodide and potassium bromide. In addition, the slack recovery rate A as a stabilization factor of the fiber polymer structure for preventing reduction in physical properties is preferably 4.0% or less. The slack recovery rate A is more preferably 3.5% or less.

The polyamide fiber of the present invention can be produced by a melt spinning method. FIG. 1 is an example of the equipment for producing the polyamide fiber of the present invention and depicts a two-stage stretching process.

A filament yarn 2 spun out from a spinneret pack 1 provided in a melt spinning machine is immediately cooled/solidified with cold air at 0.5 to 1.2 m/sec fed from a cold air tube 3.

Subsequently, a spin finish oil is applied at 0.5 to 2.0% through an oiling nozzle 4, and the fiber is taken off by winding it around a take-off roll 5. The spin finish roll applied may be aqueous or non-aqueous but is preferably a non-hydrous spin finish oil. As for the preferred spin finish oil composition, examples of the spin finish oil include a non-aqueous spin finish oil obtained by diluting an alkyl ether ester as a lubricant component, an alkylene oxide adduct of a higher alcohol as a surfactant component, an organic phosphate salt as an extreme-pressure agent component, and the like with a mineral oil. The taken-off unstretched yarn is continuously delivered to a stretching step without being once taken up.

The stretching process is preferably performed by a multistage stretching method. In stretching the spun yarn, it is preferred to first perform former stretching at a low temperature of less than 150° C., subsequently perform latter stretching at a high temperature of 150° C. or more, based on the total draw ratio for obtaining the necessary tensile strength, and through heat setting for fixing the structure and tension relaxation by a relaxation treatment, finally take up the yarn. Each of the former stretching and latter stretching may be performed by a multistage stretching method. The filament yarn is preferably stretched by utilizing the difference in speed between rolls. The number of stretching stages is not particularly limited, but preferably a two-stage stretching process, more preferably a three-stage stretching process, is used. In the stretching step depicted, a first stretching roll 6, a second stretching roll 7, a third stretching roll 8, and a relax roll 9 are provided, and stretching, heat treatment and the like are performed by sequentially winding the filament yarn over respective rolls to obtain desired physical properties. First, a light tension is kept between the take-off roll and the first stretching roll. The stretch percentage between the rolls is preferably from 0.5 to 5%. The surface temperature of the take-off roll is preferably from 20 to 50° C. in the subsequent former stretching process, since stretching is performed in a low temperature region of less than 150° C., the temperature of the first stretching roll is preferably from 40° C. of less than 150° C. The temperature of the second stretching roll for latter stretching of performing the stretching in a high temperature region is preferably from 150 to 230° C. in the subsequent heat setting, the third stretching roll and the relax roll are preferably set to a temperature of 150 to 250° C.

In the present invention, the draw ratio in cold stretching at less than 150° C. is preferably set to be from 25 to 55% of the total draw ratio. In the example depicted in FIG. 1, the first-stage stretching performed between the first stretching roll and the second stretching roll may be set to a ratio of 25 to 55%, preferably from 30 to 50%, based on the total draw ratio. In the subsequent hot stretching at 150° C. or more stretching may be performed until reaching a total draw ratio in a level sufficient to develop the desired strength. For example, hot stretching in the second stage performed between the second stretching roll and the third stretching roll after cold stretching in the first stage may be performed at the remaining draw ratio. If the cold stretch performed at less than 25% of the total draw ratio, the percentage of hot stretching based on the total draw ratio becomes relatively high, and orientational crystallization due to stretching and thermal crystallization due to roll heating proceed in combination, as a result, a high-strength yarn may not be obtained or even if obtained, many broken filaments in yarn may be produced, giving rise to a problem in the quality. Keeping the cold stretching stage to a ratio of 55% or less leads to sufficient development of the polymer structure in the subsequent hot stretching stage and increase in the slack recovery rate A after fixed-length dry heat treatment. In turn, the loosening resistance of a fabric produced is advantageously improved. In conventional stretching, breakage at hot stretching in the hot stretching part of the second stage is prevented by setting the cold stretching in the first stage to a ratio of more than 55%. However, in the present invention, the initial hot stretching roll (second stretching roll 7) in the hot stretching part has a satin finish surface to increase the roughness, and thus the yarn appropriately slides on the roll. As a result, stretching is performed not only between former and latter rolls differing in the speed but also on the same-stage roll by utilizing the sliding until the filament yarn and roll speeds reach the same speed so as to slowly change the strain rate, whereby the ratio of hot stretching in the second stage can be increased. The roughness Ra of the initial hot stretching roll (second stretching roll 7) is preferably 2.0 μm or more, more preferably from 2.0 to 5.0 μm, still more preferably from 3.0 to 5.0 μm, yet still more preferably from 3.5 to 5.0 μm. When the roughness is 2.0 μm or more, a sufficiently large speed difference between the filament yarn speed and the roll speed is produced on the roll, and slow stretching results. On the other hand, when the roughness is 5.0 μm or less, the roll can be worked to produce sufficiently uniform surface roughness.

In the relaxation treatment and heat setting subsequent to the stretching, a strain produced by hot stretching is removed. That is, the orientation in amorphous region is relaxed, and the structure achieved by stretching is fixed. As a result, the shrinkage in boiling water and the slack recovery rate are adjusted. When the heat setting temperature is set low, the shrinkage in boiling water tends to become large, and also, when the temperature is lowered in multiple stages by adjusting the temperatures of the third stretching roll and the relax roll, the slack recovery rate tends to rise.

In the step of relaxation treatment and heat setting, a relaxation treatment in a total amount of more than 0% to 14.0% is preferably performed between after the stretching and before a winder so as to relax the stress and strain residing in the filament yarn. Furthermore, in the relaxation treatment, stepwise relaxation is preferably performed.

For example, in the relaxation treatment and heat setting, the temperature of the third stretching roll is set higher than the temperature of the relax roll. First, relaxation and take-off by the relax roll occur owing to the temperature of the third stretching roll, and then, the filament yarn is taken up while again undergoing relaxation between the relax roll lower in the lower temperature than the third stretching roll and a winder. That is, this step is performed in two stages while lowering the heat setting temperature. Preferred temperatures of the third stretching roll and the relax roll, which work out to the heat setting temperature, are respectively from 250 to 150° C. and from 180 to 50° C. The temperature of the relax roll is more preferably from 160 to 70° C., still more preferably from 150 to 80° C. In the heat setting and relaxation treatment, the heat treatment is preferably performed by stepwise lowering the temperature.

In addition, out of stepwise relaxation treatment, among others, the first relaxation treatment, that is, relaxation between the third stretching roll and the relax roll, is preferably performed in excess of 2.0% so as to increase the slack recovery rate A.

Also, the relaxation treatment preferably involves relaxation in excess of 0.5% between the relax roll and the winder, and taking-up in the relaxation condition makes it easy to maintain the mechanical properties after a heat resistance test. If taking-up is performed in the tension condition by completing a relaxation treatment at 50° C. or more before taking-up, mechanical properties can be hardly maintained after a heat resistance test.

The filament yarn subjected to the relaxation treatment is taken up by a winder 10. In order to prevent unraveling of the filament yarn in the weaving step, the filament yarn may be taken up while bundling the filament yarns by blowing a high-pressure fluid onto the filament yarn between the relax roll and the winder to interlace the filament yarns. As the apparatus for interlacing the filament yarns, a known interlacing apparatus may be used without any problem.

The total draw ratio from the take-off roll to the final stretching roll, i.e., in the case of the above-described two-stage stretching process, the third roll, may vary depending on the characteristics of the polymer or the spinning and cooling conditions of the spun yarn but is set to a draw ratio capable of developing the required tensile strength and is preferably from 4.0 to 6.0 times.

As for the woven structure of the airbag fabric of the present invention, a plain fabric, a twill fabric, a satin fabric, a deformation thereof, and the like can be used, but the present invention is not limited thereto. Among these woven structures, in view of fabric cost and isotropic deployment of the airbag, a plain fabric is preferably used. The fabric may not necessarily have a symmetric structure but may have an asymmetric structure. The asymmetric structure as used herein means the relationship between warp yarn and weft yarn, for example, means the difference in the yarn density or structure, that is, the structure differs in the plain fabric, for example, the number of yarns differs between the warp yarn and the weft yarn, one member of warp and weft uses a different yarn species, or one member of warp and weft has a ripstop of shadow stripe structure. Also, a double-ply fabric may be woven by a Jacquard loom and formed into an airbag by hollow weaving. The weaving machine is not particularly limited, and a waterjet loom, an airjet loom, a rapier loom, and the like can be used.

Scouring after weaving can be performed by a known method. For example, hot-water washing or warm water washing with a detergent may be performed by using a jigger scouring machine or the like in the case of a batch process, and using an open soaper or the like in the case of a continuous process. The water temperature is from 60 to 120° C., and pressure scouring can also be performed. In the batch process, the fabric can be passed through a hot bath a plurality of times by repeating the turnaround, and the temperature may be sequentially changed by replacing the hot bath, or the detergent component may be changed. Also in the continuous process, the fabric can be dipped a plurality of time by employing a multistage immersion bath, and in the multistage bath, the temperature may be changed sequentially, or the detergent component may be changed. Furthermore, scouring after weaving may also be omitted. In particular, when the weaving is performed by a waterjet loom, the yarn-making oil may fall off substantially, making it possible to omit scouring after weaving, and this is economically preferred.

After waterjet weaving, scouring and the like, the fabric can be dried. As for the drying method, a hot air dryer, a hot roller heater, and the like are used. The temperature can be set in the range of 100 to 200° C. Heat setting may be performed at the same time by using a device capable of controlling the tension in the warp direction, that is, the fabric running direction, or in the weft direction, that is, the fabric width direction. As for the heat setting device, a hot roller heater, a tenter and the like can be used. Above all, when the resistance to heat shrinkage stress in the warp and weft directions of the fabric is controlled, the fabric configuration on heating the fabric and the difference in crimp percentage between warp and weft can be advantageously controlled. In both the warp and weft directions, the tension during heating is preferably controlled using a tenter.

The fabric can be used as a non-coated airbag base fabric by weaving it at a high density. On the other hand, when the fabric is coated and made air-impermeable by the film formed, the fabric can be used as a coated airbag base fabric. As for the coating method, all of the methods such as knife coating, comma coating, roll coating, dip coating and spray coating can be performed. Among others, air knife coating is preferred to obtain a flexible coated base fabric by forming a relatively thin film on the fabric surface and allowing little penetration of the coating material. As the coating material, various elastomers can be used. Silicone is preferred because of its excellent cold flexibility as well as durability, and a solventless addition-type silicone is more preferred. The addition-type silicone undergoes a crosslinking reaction at 150 to 200° C. and therefore, passes through a heating and vulcanizing step. In this step, applying a heating process to control the fabric configuration on heating the fabric and the difference in crimp percentage between warp and weft is also preferred.

The airbag fabric of the present invention is cut and sewn and thereby can provide an airbag. Also, when the airbag fabric is woven by hollow weaving, an airbag is formed by cutting outside the portion where a bag is formed by a binding structure. The obtained airbag is used as an airbag device after attaching an inflator to the gas inlet of the airbag. As for the inflator, a pyro type, a hybrid type, a stored gas type, and the like are used. The airbag includes a driver's seat airbag, a passenger seat airbag, a side airbag, a side curtain airbag, a rear wind shield airbag, a pedestrian protection airbag, and the like.

EXAMPLES

The present invention is described below by referring to Examples, but the present invention is not limited only to these Examples. Incidentally, the definitions and measuring methods of physical properties referred to in the description of the present invention and Examples are as follows.
(1) Formic Acid Relative Viscosity (VR)

After sufficiently dissolving 4.5 g of sample in 90% formic acid to have a concentration of 8.4 wt %, the solution was left to stand in an environment at a water temperature of 25° C. for 10 minutes, and the falling time of the solution was measured using a Ubbelohde viscometer. The falling time of the solvent was evaluated by the same method, and VR was determined based on the following formula:

$$VR = \text{falling time (sec) of sample solution} / \text{falling time (sec) of solvent}$$

(2) Roughness

The roughness is a value measured using a surface roughness meter (Surfoorder SE-40D, manufactured by Kosaka Laboratory Ltd.) in accordance with the standard for stylus surface roughness measurement of JIS B0651, and the centerline average roughness (Ra) was measured.
(3) Total Fineness (dtex)

This was measured by the method described in JIS L 1017 8.3.
(4) Single Yarn Fineness (dtex)

The single yarn fineness was determined by dividing the total fineness determined by the method described in JIS L 1017 8.3, by the number of single yarn filaments constituting the filament yarn.
(5) Tensile Strength (cN/dtex) and Tensile Elongation at Break (%)

The tensile strength was determined by dividing the tensile strength measured by the method described in JIS L 1017 8.5, by the total fineness. Also, the elongation at break was determined.
(6) Intermediate Elongation (%)

Figure 2:
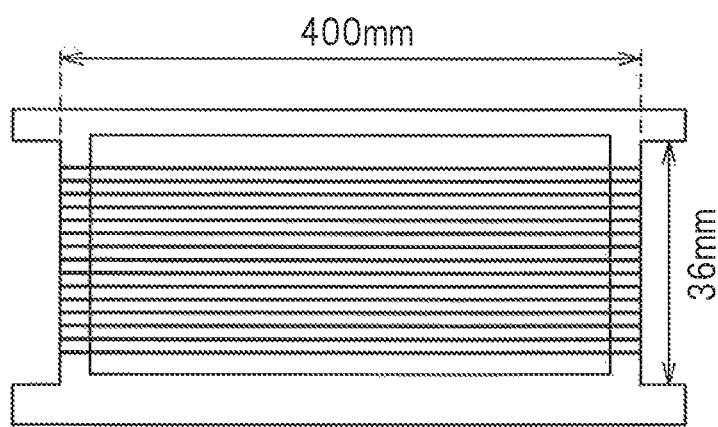
FIG. 2 is a view for explaining the method for measuring the slack recovery rate after fixed-length dry heat treatment.
Figure 2:
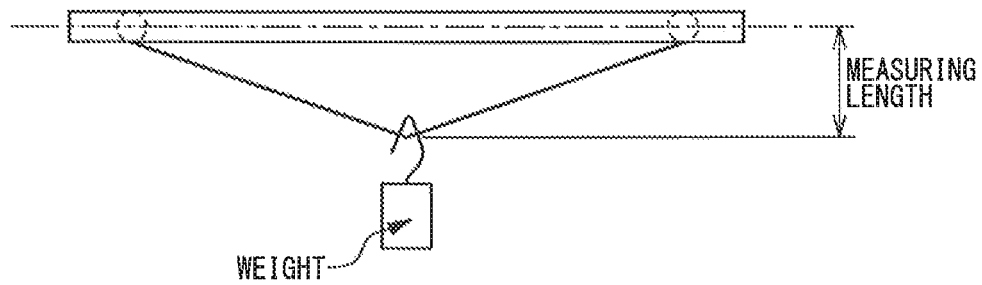

A constant load elongation percentage measured by the method described in JIS L 1017 8.7 was taken as the intermediate elongation.
(7) Slack Recovery Rate A (%) after Fixed-Length Dry Heat Treatment As shown in FIG. 2(a), a filament yarn was wound around a frame of 400 mm in width (15 turns at a winding tension of 0.2 cN), fixed by tying the end of yarn to the frame, heat-treated for 24 hours in an environment of 120° C. by using a hot air dryer, and then left to stand still in the normal state, and the slack was measured by continually applying, as shown in FIG. 2(b), a load over time. The load was applied to 5 filament yarns by using a weight to become 0.01 cN/dtex. The measurement over time after heat treatment was performed by measuring the slack immediately (within 1 hr) and after 6 hr, 24 hr, 48 hr and 72 hr, and the point at which the displacement from the previous measurement became 0.1 mm or less was regarded as stabilized. The percentage change between the amount of slack when measured within 1 hour after heat treatment and the amount of slack when stabilized was taken as the slack recovery rate (A). In the test, measurement was performed thrice every passage of time, and the average value thereof was used.

$$A(\%)=[(Ta-Tb)/Ta]\times 100 \qquad (1)$$

In formula (1), Ta is the amount of slack immediately after heat treatment, and Tb is the amount of slack when stabilized after heat treatment.

(8) Shrinkage B in Boiling Water (%)

The shrinkage in boiling water was measured by the method described in JIS L 1017 8.14.

(9) Deployability (msec)

Figure 3:
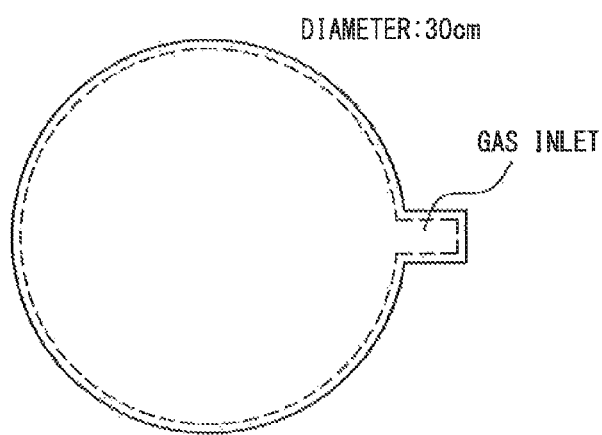
FIG. 3 is a plan view of a circular simulated airbag used in Examples.
Figure 3:
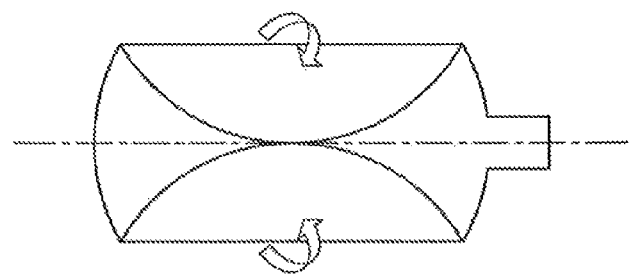
Figure 3:
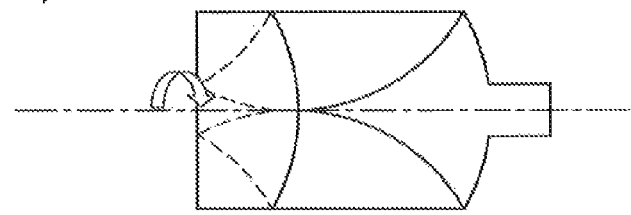
Figure 3:
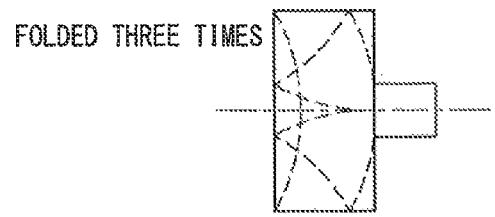

The fabric was cut into a circular shape large enough to ensure a diameter of 30 cm, and a simulated airbag was sewn in the manner of laminating together two sheets of the circularly cut fabric. As shown in FIG. 3(a), a gas inlet of 100 mm×80 mm was provided in the airbag, and the laminated portion of the inlet in the airbag was partially inserted into a tubular gas injection port and hermetically fixed to allow for no gas leakage. Subsequently, as shown in FIGS. 3(b) to (d), the simulated airbag expanding in a semicircle to the right and left with respect to the gas inlet was folded toward the center by avoiding overlap between respective folds and thereafter, folded three times at intervals of 10 cm from the side opposite the gas inlet toward the inlet side. In the evaluation of deployability, the point at which when a compressed helium gas of 7.5 MPa in a 720-cc tank was introduced at a burst into the airbag, the airbag inner pressure became maximum was regarded as the deployment completion point, and the deployability was relatively evaluated by the completion point arrival time. By using the deployment completion time of 30 msec as the benchmark (100), the deployability was evaluated as follows by the deployment completion time. The test was performed 3 times, and the average value thereof was used as the deployment completion time.

A: The deployment completion time was less than 90.
B: The deployment completion time was from 90 to 110.
C: The deployment completion time was more than 110.

(10) Loosening Resistance and Burst Resistance

After performing the evaluation of deployability with a high-pressure compressed gas of 15 MPa in a 720-cc tank, the airbag was examined for the overall appearance and evaluated according to the following criteria.

A: Neither burst (rupture) nor weave loosening was observed.
B: Weave loosening was observed.
C: Burst.

Example 1

Spinning was performed using the equipment shown in FIG. 1. A pellet-like nylon 66 polymer having a formic acid relative viscosity of 100 and containing 50 ppm of copper element and 1,600 ppm of iodine was melted at a temperature of 295° C. by using an extruder-type extruding machine, then homogenized in the temperature to 300° C. by a spin head, weighed in a gear pump from the spin head to give the fineness shown in Table 1, and spun out from the spinneret pack. The spun-out polymer was cooled/solidified with cold air to form a filament yarn. The solidified filament yarn was provided with a spin finish oil and without being once taken up, taken off by the take-off roll. The taken-off filament yarn was stretched by 1% between the take-off roll and the first stretching roll and then subjected to first-stage stretching of 2.25 times between the first stretching roll and the second stretching roll and further to second-stage stretching of 2.35 times between the second stretching roll and the third stretching roll. The filament yarn after stretching was relaxed by 3.5% between the third stretching roll and the relax roll and thereafter, while appropriately interlacing the yarns by an interlacing apparatus (not shown), taken up with relaxation of 3.5%, i.e., at a speed ratio of 0.965, between the relax roll and the winder. The temperatures of the take-off roll, the first stretching roll, the second stretching roll, the third stretching roll and the relax roll were respectively non-heated, 60° C., 200° C., 170° C. and 150° C., and the number of windings of the filament yarn on the rolls was set to 1, 2, 3, 2 and 1, respectively. At this time, the total draw ratio was 5.34 times. The roughness Ra of the hot stretching roll (second stretching roll) was set to 4.0 µm. The obtained nylon 66 original yarn was warped at a speed of 500 m/min and then woven at a rotation speed of 800 rpm by using a waterjet loom (ZW303 manufactured by Tsudakoma Corp. to obtain a fabric. The weave density of warp and weft yarns was adjusted to 74 ends×74 ends per 2.54 cm through cylinder drying at 120° C., and in this way, a base fabric for airbag fabric was obtained. This base fabric was cut, sewn and used for a deployability test and a loosening resistance and burst resistance test. The results obtained are shown in Table 1 together with the evaluation results of the filament yarn.

Example 2

Melt spinning was performed in the same manner as in Example 1 to give the fineness shown in Table 1 by using the same nylon 66 polymer as in Example 1. The taken-off filament yarn was stretched by 1% between the take-off roll and the first stretching roll and then subjected to first-stage stretching of 1.90 times between the first stretching roll and the second stretching roll and further to second-stage stretching of 2.80 times between the second stretching roll and the third stretching roll. The filament yarn after stretching was relaxed by 5.5% between the third stretching roll and the relax roll and thereafter, taken up by the winder while appropriately interlacing the yarns by an interlacing apparatus. Between the relax roll and the winder, the filament yarn was taken up with relaxation of 4.0%. The temperatures of the take-off roll, the first stretching roll, the second stretching roll, the third stretching roll and the relax roll were respectively non-heated, 60° C., 200° C., 200° C. and 150° C., and the number of windings of the filament yarn on the rolls and the roughness of the hot stretching roll (second stretching roll) were set in the same manner as in Example 1. An airbag fabric was obtained in the same manner as in Example 1 except that the obtained nylon 66 original yarn was used and the weave density of warp and weft yarns was adjusted to 55 ends×55 ends, and used for a deployability test and a loosening resistance and burst resistance test. The results obtained are shown in Table 1 together with the evaluation results of the filament yarn.

Example 3

Melt spinning was performed in the same manner as in Example 2 to give the fineness shown in Table 1 by using the same nylon 66 polymer as in Example 1. The filament yarn taken off by the take-off roll was subjected to the seine stretching and relaxation treatments as in Example 2 except that the draw ratio between the first stretching roll and the second stretching roll was set to 2.00 times, the draw ratio between the second stretching roll and the third stretching roll was set to 2.45 times, and the relaxation between the third stretching roll and the relax roll was set to 4.5%. An airbag fabric was obtained in the same manner as in Example 1 except that the obtained nylon 66 original yarn was used and the weave density of warp and weft yarns was adjusted to 55 ends×55 ends, and evaluated in the same manner as in Example 1. The results obtained are shown in Table 1 together with the evaluation results of the filament yarn.

Example 4

A nylon 66 original yarn obtained in the same manner as in Example 3 was wound around a frame, fixed by tying the end of yarn to the frame, and subjected to heat aging of 110° C.×3000 hr in a hot air dryer. The nylon 66 original yarn was measured for the tensile strength and tensile elongation at break before and after aging, and the physical property retention percentage was calculated. The measurement was performed 10 times, and the measured values were averaged. The results obtained are shown in Table 1.

Example 5

Melt spinning was performed in the same manner as in Example 2 to give the fineness shown in Table 1 by using the same nylon 66 polymer as in Example 1. The filament yarn taken off by the take-off roll was subjected to the same stretching and relaxation treatments as in Example 2 except that the draw ratio between the first stretching roll and the second stretching roll was set to 1.65 times, the draw ratio between the second stretching roll and the third stretching roll was set to 3.00 times, the relaxation between the third stretching roll and the relax roll was set to 4.0%, the relaxation between the relax roll and the winder was set to 2.0%, and the temperature of the third stretching roll was set to 170° C. An airbag fabric was obtained in the same manner as in Example 1 except that the obtained nylon 66 original yarn was used and the weave density of warp and weft yarns was adjusted to 55 ends×55 ends, and evaluated in the same manner as in Example 1. The results obtained are shown in Table 1 together with the evaluation results of the filament yarn.

Example 6

A nylon 66 original yarn obtained in the same manner as in Example 5 was wound around a frame, fixed by tying the end of yarn to the frame, and subjected to heat aging of 110° C.×3000 hr in a hot air dryer. The nylon 66 original yarn was measured for the tensile strength and tensile elongation at break before and after aging, and the physical property retention percentage was calculated. The measurement was performed 10 times, and the measured values were averaged. The results obtained are shown in Table 1.

Comparative Example 1

Melt spinning was performed in the same manner as in Example 1 to give the fineness shown in Table 1 by using the same nylon 66 polymer as in Example 1. The filament yarn taken off by the take-off roll was subjected to the same stretching and relaxation treatments as in Example 1 except that the draw ratio between the first stretching roll and the second stretching roll was set to 3.45 times, the draw ratio between the second stretching roll and the third stretching roll was set to 1.50 times, the roughness Ra of the hot stretching roll (second stretching roll) was set to 1.5 µm, the relaxation between the relax roll and the winder was set to 3.0%, the temperature of the second stretching roll was set to 210° C., the temperature of the third stretching roll was set to 180° C., and the number of windings of the filament yarn on the third stretching roll was set to 3. An airbag fabric was obtained in the same manner as in Example 1 except for using the obtained nylon 66 original yarn and evaluated in the same manner as in Example 1. The results obtained are shown in Table 1 together with the evaluation results of the filament yarn. With respect to the deployability, a good result was obtained, but when the outer appearance of the airbag was examined, weave loosening was observed.

Comparative Example 2

A pellet-like nylon 66 polymer having a formic acid relative viscosity of 110 and containing 50 ppm of copper element and 1,600 ppm of iodine was melted at a temperature of 295° C. by using an extruder-type extruding machine, then homogenized in the temperature to 300° C. by a spin head, weighed in a gear pump from the spin head to give the fineness shown in Table 1, and spun out from the spinneret pack. The spun-out polymer was cooled/solidified with cold air to form a filament yarn. The solidified filament yarn was provided with a spin finish oil and without being once taken up, taken off by the take-off roll. The taken-off filament yarn was stretched by 1% between the take-off roll and the first stretching roll and then subjected to first-stage stretching of 3.72 times between the first stretching roll and the second stretching roll and further to second-stage stretching of 1.30 times between the second stretching roll and the third stretching roll. The filament yarn after stretching was relaxed by 6.0% between the third stretching roll and the relax roll and thereafter, while appropriately interlacing the yarns by an interlacing apparatus, taken up with relaxation of 4.0% between the relax roll and the winder. The temperatures of the take-off roll, the first stretching roll, the second stretching roll, the third stretching roll and the relax roll were respectively non-heated, 60° C., 210° C., 230° C. and 170° C., and the number of windings of the filament yarn on the rolls was set to 1, 2, 3, 4 and 1, respectively. At this time, the total draw ratio was 4.88 times. The roughness Ra of the hot stretching roll (second stretching roll) was set to the same roughness as in Comparative Example 1. The obtained nylon 66 original yarn was warped at a speed of 500 m/min and then woven at a rotation speed of 800 rpm by using a waterjet loom (ZW303) manufactured by Tsudakoma Corp. to obtain a fabric. The weave density of warp and weft yarns was adjusted to 55 ends×55 ends through cylinder drying at 120° C., and in this way, a base fabric for airbag fabric was obtained. An airbag was sewn from this base fabric and used for a deployability test and a loosening resistance and burst resistance test. The results obtained are shown in Table 1 together with the evaluation results of the filament yarn. The deployability was relatively good, but when the outer appearance of the airbag was examined, weave loosening was observed.

Comparative Example 3

Melt spinning was performed in the same manner as in Comparative Example 2 to give the fineness shown in Table 1 by using the same pellet-like nylon 66 polymer as in Example 1. The taken-off filament yarn was stretched by 1% between the take-off roll and the first stretching roll and then subjected to first-stage stretching of 3.40 times between the first stretching roll and the second stretching roll and further to second-stage stretching of 1.4 times between the second stretching roll and the third stretching roll. The filament yarn after stretching was relaxed by 8.0% between the third stretching roll and the relax roll and thereafter, while appropriately interlacing the yarns by an interlacing apparatus, taken up by the winder with relaxation of 1.5% between the relax roll and the winder. The temperatures of the take-off roll, the first stretching roll, the second stretching roll, the third stretching roll and the relax roll were respectively non-heated, 60° C., 210° C., 150° C. and 150° C., and the number of windings of the filament yarn on the rolls was set to 1, 2, 3, 2 and 1, respectively. The roughness of the hot stretching roll (second stretching roll) was set to the same roughness as in Comparative Example 1. A base fabric for airbag fabric was obtained in the same manner as in Comparative Example 2 by using the obtained nylon 66 original yarn, and an airbag was sewn and used for a deployability test and a loosening resistance and burst resistance test. The results obtained are shown in Table 1 together with the evaluation results of the filament yarn. The deployment speed was slow, and a bag burst was confirmed.

Comparative Example 4

Melt spinning was performed to give the fineness shown in Table 1 by using the same nylon 66 polymer as in Example 1. The filament yarn taken off by the take-off roll was stretched by 1% between the take-off roll and the first stretching roll and then subjected to first-stage stretching of 3.27 times between the first stretching roll and the second stretching roll and further to second-stage stretching of 1.56 times between the second stretching roll and the third stretching roll. The filament yarn after stretching was relaxed by 4.5% between the third stretching roll and the relax roll and thereafter, while appropriately interlacing the yarns by an interlacing apparatus, taken up by the winder with relaxation of 3.0% between the relax roll and the winder. The temperatures of the take-off roll, the first stretching roll, the second stretching roll, the third stretching roll and the relax roll were respectively non-heated, 60° C., 210° C., 200° C. and 150° C., and the number of windings of the filament yarn on the rolls was set to 1, 2, 3, 2 and 1, respectively. The roughness of the hot stretching roll (second stretching roll) was set to the same roughness as in Comparative Example 1. A base fabric for airbag fabric was obtained in the same manner as in Comparative Example 2 by using the obtained nylon 66 original yarn, and an airbag was sewn and used for a deployability test and a loosening resistance and burst resistance test. The results obtained are shown in Table 1 together with the evaluation results of the filament yarn. The deployability was relatively good, but when the outer appearance of the airbag was examined, weave loosening was observed.

Comparative Example 5

Melt spinning was performed in the same manner as in Example 1 to give the fineness shown in Table 1 by using the same nylon 66 polymer as in Example 1. However, in this Example, the relax roll was not used. The filament yarn taken off by the take-off roll was stretched by 1% between the take-off roll and the first stretching roll and when subjected to first-stage stretching of 2.0 times between the first stretching roll and the second stretching roll and further to second-stage stretching of 2.7 times between the second stretching roll and the third stretching roll. The number of windings of the filament yarn on the take-off roll, the first stretching roll, the second stretching roll and the third stretching roll was set to 1, 2, 3 and 4, respectively, and while appropriately interlacing the yarns by an interlacing apparatus, the filament yarn was relaxed by 5.0% between the third roll and the winder and then taken up by the winder. The temperatures of the take-off roll, the first stretching roll, the second stretching roll and the third stretching roll were respectively non-heated, 70° C., 225° C. and 190° C., and the roughness Ra of the second stretching roll was set to 4.0 μm. An airbag fabric was obtained in the same manner as in Example 1 except for using the obtained nylon 66 original yarn and setting the weave density of warp and weft yarns to 55 ends×55 ends per 2.54 cm and used for a deployability test and a loosening resistance and burst resistance test. The results obtained are shown in Table 1 together with the evaluation results of the filament yarn. The deployment speed was slow, and when the outer appearance of the airbag was examined, weave loosening was observed.

TABLE 1

|  |  | Example | | | | | | Comparative Example | | | | |
| --- | --- | --- | --- | --- | --- | --- | --- | --- | --- | --- | --- | --- |
|  |  | 1 | 2 | 3 | 4 | 5 | 6 | 1 | 2 | 3 | 4 | 5 |
| Total fineness | (dtex) | 235 | 470 | 470 | 470 | 470 | 470 | 233 | 470 | 470 | 470 | 470 |
| Single yarn fineness | (dtex) | 3.3 | 6.5 | 6.5 | 6.5 | 6.5 | 6.5 | 3.4 | 6.5 | 6.5 | 6.5 | 6.5 |
| Tensile strength | (cN/dtex) | 10.3 | 10.0 | 8.5 | 8.5 | 8.5 | 8.5 | 10.3 | 9.0 | 8.4 | 10.1 | 10.5 |
| Intermediate elongation | (%) | 11.5 | 11.0 | 11.2 | 11.2 | 11.5 | 11.5 | 11.5 | 11.0 | 13.2 | 11.0 | 12.8 |
| Shrinkage in boiling water (B) | (%) | 10.1 | 6.5 | 7.3 | 7.3 | 10.5 | 10.5 | 9.2 | 8.2 | 3.5 | 7.1 | 9.0 |
| Slack recovery rate (A) | (%) | 0.32 | 2.05 | 1.6 | 1.6 | 3.8 | 3.8 | 0.28 | 0.7 | 1.98 | 0.85 | 0.18 |
| Tightening factor (F) (F = A + 0.35 × B) |  | 3.86 | 4.33 | 4.16 | 4.16 | 7.48 | 7.48 | 3.50 | 3.57 | 3.21 | 3.34 | 3.33 |
| Deployability | msec | 23.5 | 24.0 | 24.2 |  | 24.0 |  | 28.1 | 35.2 | 48.0 | 35.8 | 40.0 |
| Loosening resistance and burst resistance |  | A | A | A |  | A |  | B | B | C | B | B |
| Physical property retention | Tensile strength | — | — | — | 94% | — | 81% | — | — | — | — | — |
| Percentage after a heat resistance test | Tensile elongation at break | — | — | — | 92% | — | 88% | — | — | — | — | — |

INDUSTRIAL APPLICABILITY

The polyamide fiber of the present invention and a fabric thereof can be suitably utilized in the industrial material field, particularly, as an original fiber or fabric for an airbag.

DESCRIPTION OF REFERENCE NUMERALS

1 Spinneret pack
2 Filament yarn

3 Cold air tube
4 Oiling nozzle
5 Take-off roll
6 First stretching roll
7 Second stretching roll
8 Third stretching roll
9 Relax roll
10 Winder

The invention claimed is:

1. A method for producing a polyamide fiber, wherein the total fineness of said fiber is from 100 to 700 dtex, the tensile strength of said fiber is from 8.0 to 11.5 cN/dtex, the shrinkage in boiling water of said fiber is from 4.0 to 11.0%, the slack recovery rate A after fixed-length dry heat treatment represented by the following formula (1) is from 0 to 4.0%, and the tightening factor F represented by the following formula (2) is 3.8 or more:

$$A=[(Ta-Tb)/Ta]\times 100 \qquad (1)$$

wherein Ta is the amount of slack immediately after heat treatment, and Tb is the amount of slack when stabilized after heat treatment $$F=A+0.35\times B \qquad (2)$$

wherein A is the slack recovery rate after fixed-length dry heat treatment, and B is the shrinkage in boiling water the method comprising the steps of:

subjecting a yarn spun from a spinneret to a multistage stretching treatment consisting of a cold stretching stage and a hot stretching stage, wherein stretching for 25 to 55% of the total draw ratio is performed in the cold stretching stage at less than 150° C. and the remaining stretching is performed in the hot stretching stage at 150° C. or more, and applying, after the multistage stretching treatment, a stepwise relaxation treatment involving a stepwise drop of temperature between 250° C. and 50° C. in two or more stages and the yarn is then taken up, wherein the relaxation treatment immediately before the taking-up involves relaxation in excess of 0.5%.

2. The method for producing a polyamide fiber according to claim 1, wherein the surface of an initial roll in the hot stretching stage is a satin finish surface having a roughness Ra of 2 μm or more.

3. The method for producing a polyamide fiber according to claim 1, wherein the physical property retention percentage of tensile strength and tensile elongation at break after a heat resistance test at 110° C. for 3,000 hours is 80% or more.

4. The method for producing a polyamide fiber according to claim 3, wherein the physical property retention percentage of tensile strength and tensile elongation at break after a heat resistance test at 110° C. for 3,000 hours is 90% or more.

5. An airbag fabric comprising the polyimide fiber produced according to the method of any one of claims 1 to 4.

6. An airbag comprising the airbag fabric according to claim 5.

* * * * *